(12) United States Patent
Eifes et al.

(10) Patent No.: US 12,257,542 B2
(45) Date of Patent: Mar. 25, 2025

(54) FILTER AND METHOD OF OPERATING

(71) Applicants: Kristen Eifes, Yorktown, VA (US);
Daniel Eifes, Yorktown, VA (US)

(72) Inventors: Kristen Eifes, Yorktown, VA (US);
Daniel Eifes, Yorktown, VA (US)

( * ) Notice: Subject to any disclaimer, the term of this patent is extended or adjusted under 35 U.S.C. 154(b) by 452 days.

(21) Appl. No.: 17/689,529

(22) Filed: Mar. 8, 2022

(65) Prior Publication Data
US 2022/0305425 A1    Sep. 29, 2022

Related U.S. Application Data

(60) Provisional application No. 63/166,599, filed on Mar. 26, 2021.

(51) Int. Cl.
| | |
|---|---|
| *B01D 46/00* | (2022.01) |
| *B01D 46/10* | (2006.01) |
| *B01D 46/62* | (2022.01) |
| *B01D 46/64* | (2022.01) |
| *B01D 46/90* | (2022.01) |
| *F24F 8/10* | (2021.01) |

(52) U.S. Cl.
CPC ......... *B01D 46/64* (2022.01); *B01D 46/0086* (2013.01); *B01D 46/009* (2013.01); *B01D 46/10* (2013.01); *B01D 46/62* (2022.01); *B01D 46/90* (2022.01); *F24F 8/10* (2021.01); *B01D 2265/028* (2013.01); *B01D 2275/10* (2013.01); *B01D 2279/50* (2013.01)

(58) Field of Classification Search
CPC .... B01D 46/64; B01D 46/0086; B01D 46/10; B01D 46/90; B01D 46/521; B01D 46/009; B01D 46/4227; B01D 46/62; B01D 2265/028; B01D 2275/10; B01D 2259/50; F24F 8/10; F24F 3/16; F24F 11/39
USPC ............. 95/273, 287; 55/490, 495, 497, 498
See application file for complete search history.

(56) References Cited

U.S. PATENT DOCUMENTS

| | | | | |
|---|---|---|---|---|
| 4,647,373 A | * | 3/1987 | Tokar | B01D 29/111 |
| | | | | 210/493.4 |
| 6,165,240 A | * | 12/2000 | Hodge | B01D 46/0036 |
| | | | | 55/497 |
| 7,833,305 B1 | * | 11/2010 | Studer | B01D 46/2411 |
| | | | | 55/467 |
| 2012/0198804 A1 | * | 8/2012 | Kaiser | B01D 46/62 |
| | | | | 55/486 |

* cited by examiner

*Primary Examiner* — Frank M Lawrence, Jr.
(74) *Attorney, Agent, or Firm* — CANTOR COLBURN LLP

(57) ABSTRACT

A filter, a method of operating and a method of making is provided. The filter includes multiple filter layers in plurality with the structural integrity of the filter as a whole. The layers are perforated to allow any type of filtering such as but not limited to osmosis filtering, reverse osmosis filtering, static filtering, and sifting or sieve-like filtering effect as the media being filtered passes through the layers as the outermost layer collects most debris. The layers further have an adhesive relationship with each other layer and an optional base layer, so that each layer may be individually removed and the one beneath is exposed as a cleaner filter surface.

18 Claims, 9 Drawing Sheets

FILTER AND METHOD OF OPERATING

CROSS REFERENCE TO RELATED APPLICATIONS

This application claims the benefit of U.S. Provisional Application Ser. No. 63/166,599, filed Mar. 26, 2021, the entire disclosure of which is incorporated herein by reference.

BACKGROUND

Air filters are used in a variety of applications, such as but not limited to heating ventilation and air conditioning (HVAC) systems. The air filter screens debris from the intake air to prevent or reduce the risk of the debris entering the interior of the system. In the case of HVAC systems, the air filter removes debris and particles above a particular size to prevent the debris and particulate from entering the heated/cooled air stream. During summer months, a dirty or clogged air filter may freeze and eventually cause a malfunction of the HVAC system. To avoid this, air filters are periodically replaced as the filter becomes clogged from use. In a standard sized apartment, the typical replacement schedule may be once per month.

It should be appreciated that for landlords and apartment complex owners who rely on tenants to change air filters, it may be difficult to determine whether the tenant is in compliance with their maintenance obligations.

Accordingly, while existing filters are suitable for their intended purposes the need for improvement remains, particularly with an filter having the feature described herein.

BRIEF DESCRIPTION

According to one aspect of the disclosure a filter is provided. The filter includes multiple filter layers in plurality with the structural integrity of the filter as a whole. The layers are perforated to allow any type of filtering such as but not limited to osmosis filtering, reverse osmosis filtering, static filtering, and sifting or sieve-like filtering effect as the media being filtered passes through the layers as the outermost layer collects most debris. The layers further have an adhesive relationship with each other layer and an optional base layer, so that each layer may be individually removed and the one beneath is exposed as a cleaner filter surface.

According to another aspect of the disclosure, a method of operating the filter is provided. The method includes placing a filter within a device, the filter having a plurality of layers that are removably coupled to each other, each of the layers having a tab thereon. Then operating the filter in the device. On a periodic or aperiodic basis, removing a layer from an inlet side of the filter.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present application provide for a filter that may be at least partially cleaned without replacing the entire filter. In still further embodiments, the filter is comprised of a plurality of removable filter media layers that may be selectively removed to at least partially clean the filter. In still further embodiments, the filter includes a plurality indicia associated with at least one indicia associated each of a plurality of filter media layers to facilitate tracking of filter maintenance.

Figure 1:
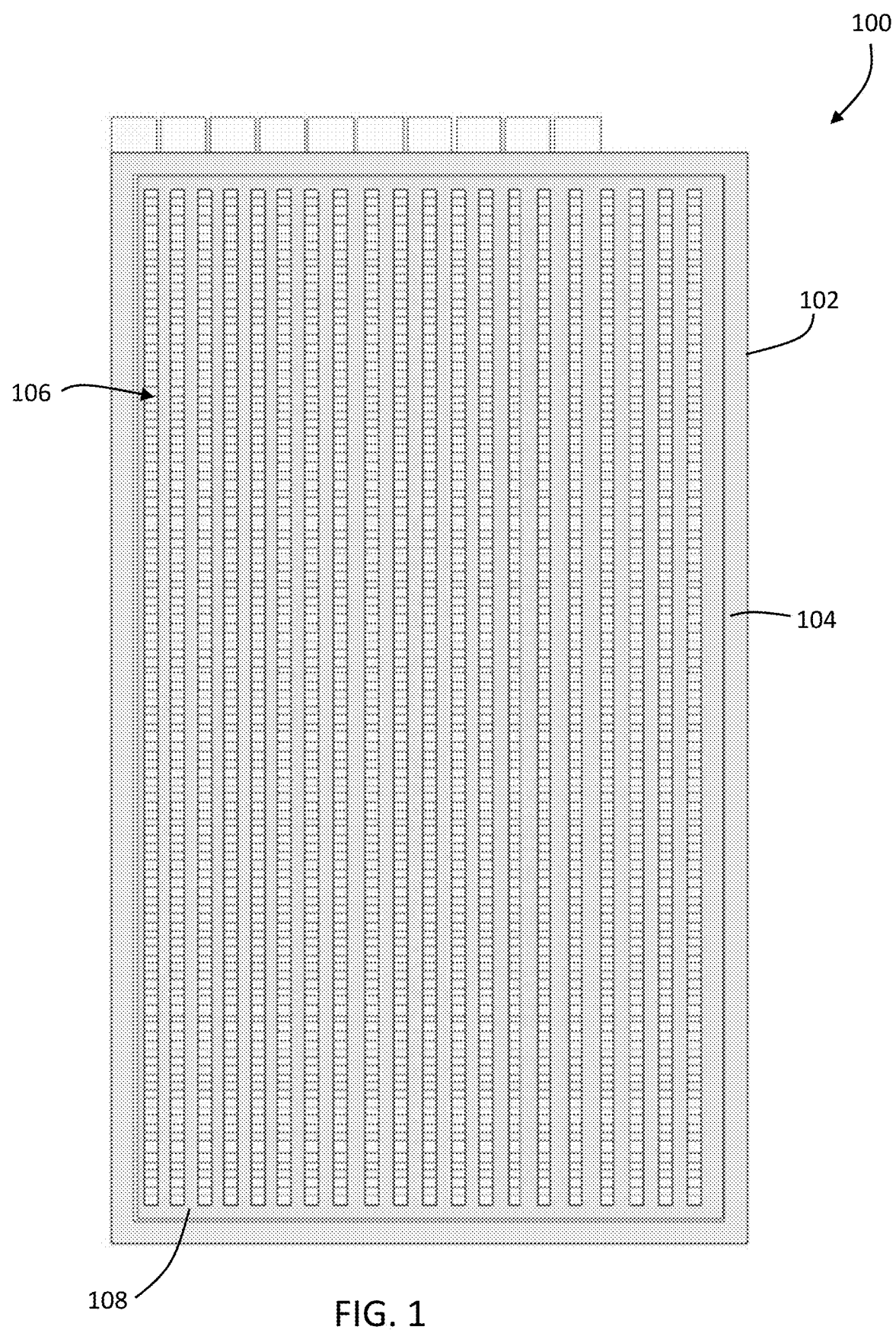
FIG. 1 is a front view of an air filter in accordance with an embodiment.
Figure 2:
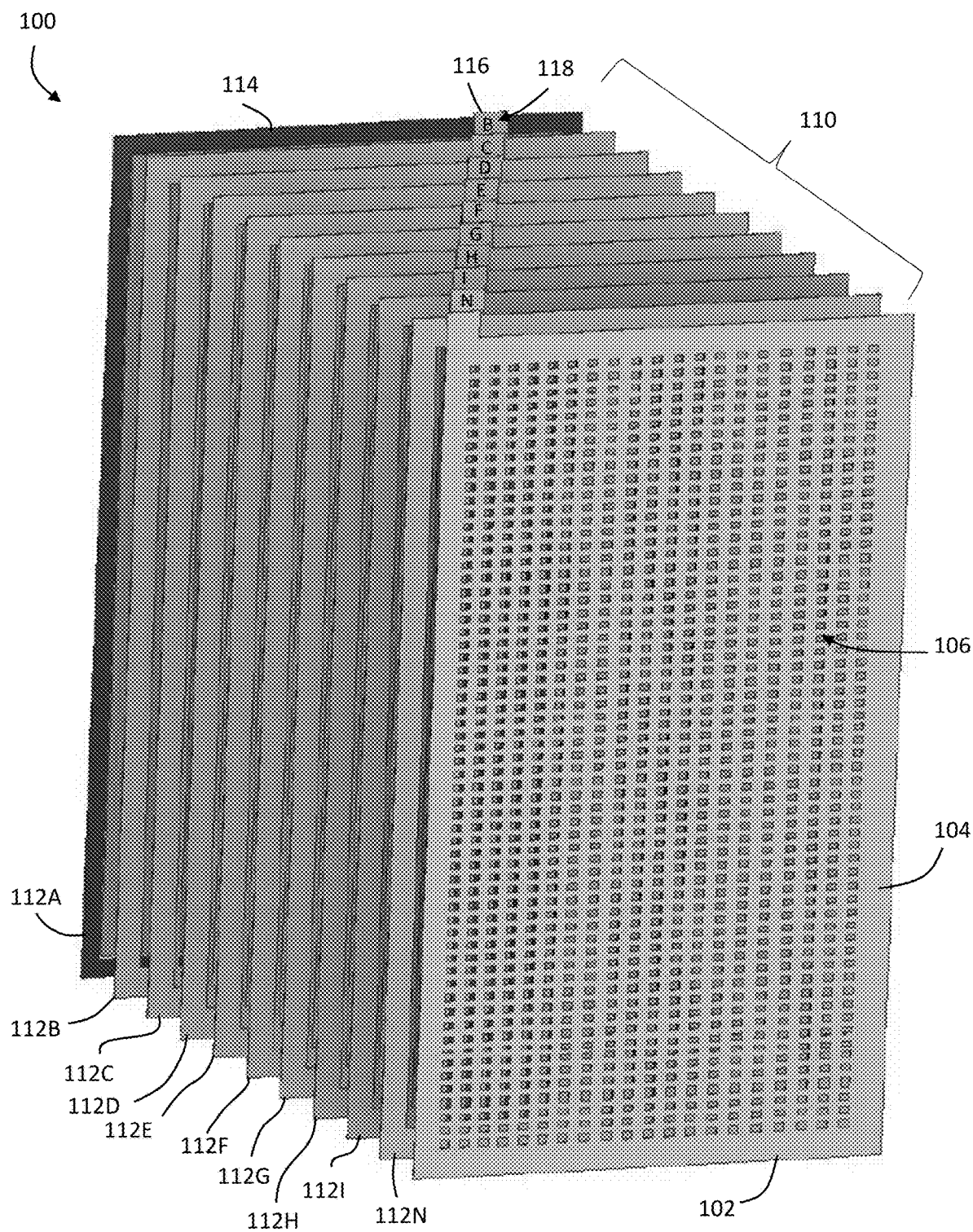
FIG. 2 is a rear exploded perspective view of the air filter of FIG. 1.
Figure 3:
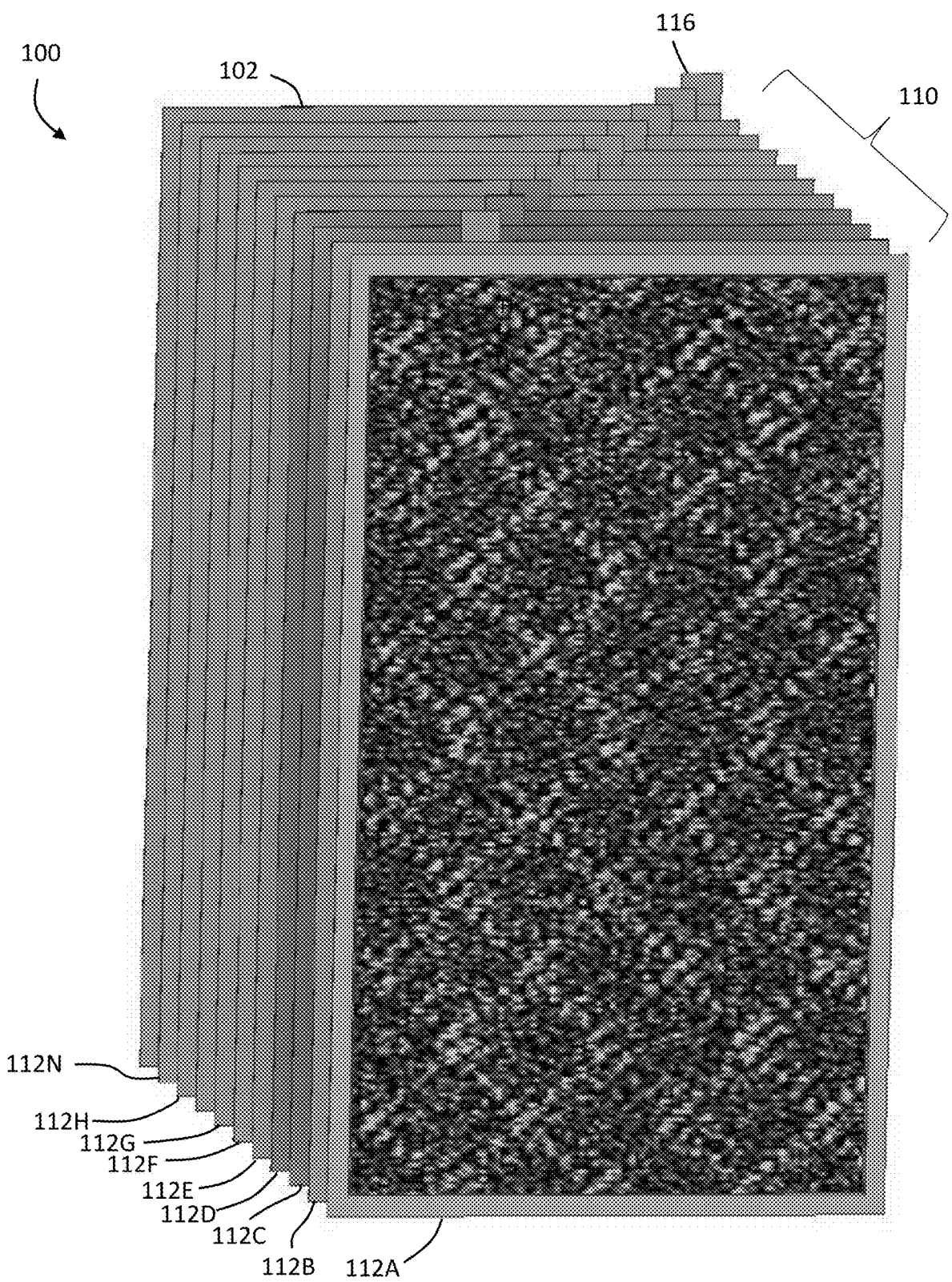
FIG. 3 is a front exploded view of the air filter of FIG. 1.

Referring to FIGS. 1-3, an embodiment is shown of an air filter 100. It should be appreciated that while embodiments herein may refer to the filtration of air, this is for exemplary purposes and the claims should not be so limited. In other embodiments, the may be used in any type of filtering such as but not limited to osmosis filtering, reverse osmosis filtering, static filtering, and sifting or sieve-like filtering effect as the media being filtered passes through the layers as the outermost layer collects most debris or particulate.

In an embodiment, the filter 100 includes a base layer 102. The base layer 102 includes a frame 104 and a plurality of orifices or openings 106 to allow the fluid medium (e.g. air) to pass therethrough. The openings 106 may be formed in a sheet 108 that is attached to the frame 104. In an embodiment, the sheet 108 and the frame 104 are integrally formed. It should be appreciated that while the openings 106 are illustrated as being formed in rows, other patterns may also be used. The base layer 102 has sufficient rigidity to support the filtration medium 110 when the air filter 100 is placed in the apparatus or system that it is intended to be used in (e.g. an HVAC system).

In the exemplary embodiment, the filtration medium 110 is comprised of a plurality of layers 112A-112N. It should be appreciated that the number of layers 112A-112N illustrated or discussed herein is intended to be for example purposes and the number of layers 112A-112N may be more or less than that shown or discussed. For example, in an air filter for an HVAC system or a residential furnace (e.g. system 400, FIG. 10), the filter may have six layers, one layer for each month of a six month maintenance cycle.

The layers 112A-112N may be made from a variety of materials, including by not limited to natural materials, synthetic materials, fibrous materials, paper, cotton, plastic, polypropylene, polyurethane, polyester, foam materials or a combination thereof. The layers 112A-112N may also include other filtration media, such as but not limited to carbon for example. In an embodiment, each of the layers 112A-112N includes a frame element 114 disposed about the periphery of the filtration medium. In other embodiments, the filtration media forms the frame element. It should be appreciated that while embodiments herein show the layers 112A-112N as being planar sheet material, this is for exemplary purposes and the claims should not be so limited. In other embodiments, the layers 112A-112N may have other shapes, such as cylindrical, spherical, corrugated, or a three-dimensional planar shape (e.g. a chevron or zig-zag shape).

In the exemplary embodiment, the layers 112A-112N are removably coupled to each other. The layers 112A-112N may be coupled using an adhesive, electro-static adhesion, an adhesive tape, or a mechanical fastener such as a staple for example. In other embodiments, as discussed herein, the layers 112A-112N may be coupled using perforations that are punched into the layers. In an embodiment, the layers 112A-112N may be coupled to each other on less than four sides, such as three-sides, two sides, or one side for example. In another embodiment, the layers 112A-112N may be coupled to each other on all four sides.

In an embodiment, each of the plurality of layers 112A-112N includes a projection or tab 116 extending from one side. The tab 116 may include indicia 118 that provide information to the user. In an embodiment, the indicia 118 may include maintenance information, such as when the layer should be removed and discarded. For example, in an embodiment, the filter 100 is an air filter for an HVAC system and the filter may be usable for six months. This filter may include six layers with the indica indicating a month when the layer should be removed. In an embodiment, the first layer 112A does not include a tab 116. In an embodiment, the tabs 116 are offset relative to an adjacent tab to allow the indicia to be viewed from the inlet side of the filter.

In an embodiment pull tabs for each layer may allow for the user to press the subsequent layer underneath the tab with a finger ensuring the subsequent layer stays in place while with the other hand the user pulls the top layer off in a rolling motion to ensure particulate debris does not fall everywhere. In an embodiment, the tabbed side or section of the pull layers would may not be adhered with adhesive to ensure a more easily layer removal process.

It should be appreciated that the filter 100 provides advantages in assisting or facilitating the maintenance of the filter on a periodic basis. By removing the layer on the upstream side of the fluid flow (e.g. the inlet side), accumulated debris and particulate may be removed from the filter, improving the flow of fluid through the filter while maintaining the desired filtration.

Figure 9:
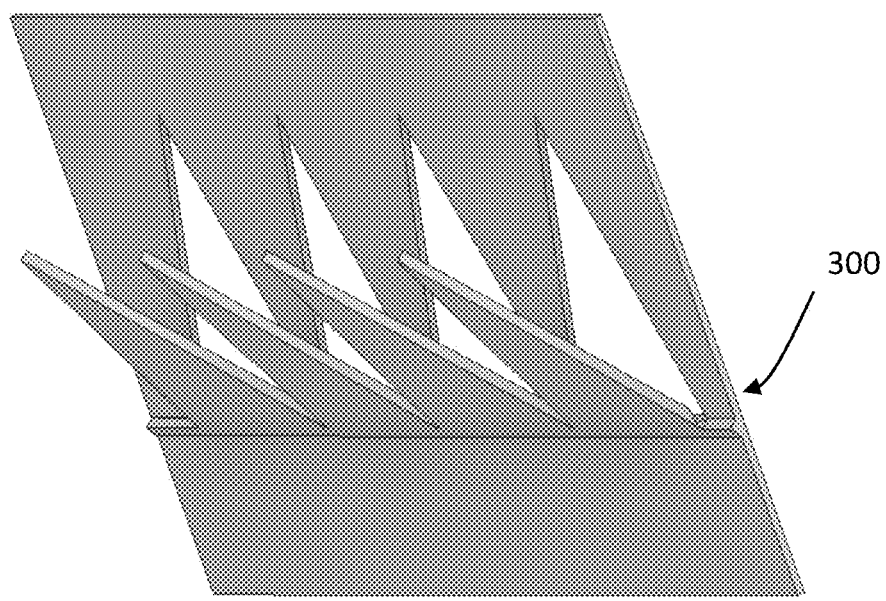
FIG. 9 is a perspective view of a filter layer that is perforated in accordance with an embodiment.

It is contemplated that the filter 100 may be formed using a variety of methods. For example, layers 112A-112N formed from a paper or plastic like layered film can be punched to leave a perforation 300 such as that shown in FIG. 9. When the outermost (closest to the inlet) layer is pulled off, the top area of the punched section will act as a knife edge to its above section underneath layer that is still in the same plane as the filter. Also any perforation such as circles or squares or mesh like perforation where an entire section is cut out from the layer material will also suffice.

It is further contemplated that the filter may be made from a cotton Material layered in a way that the last layer or base material of the air filter has the largest porous diameters and as the layers increase to the outermost layer the porous diameters are smaller. This will allow for continuous uninterrupted flow of air and if particulate matter makes it past a pull layer, the subsequent layers each with larger pore size will effectively take more time to clog up, allowing the product a maximum life period.

Figure 4:
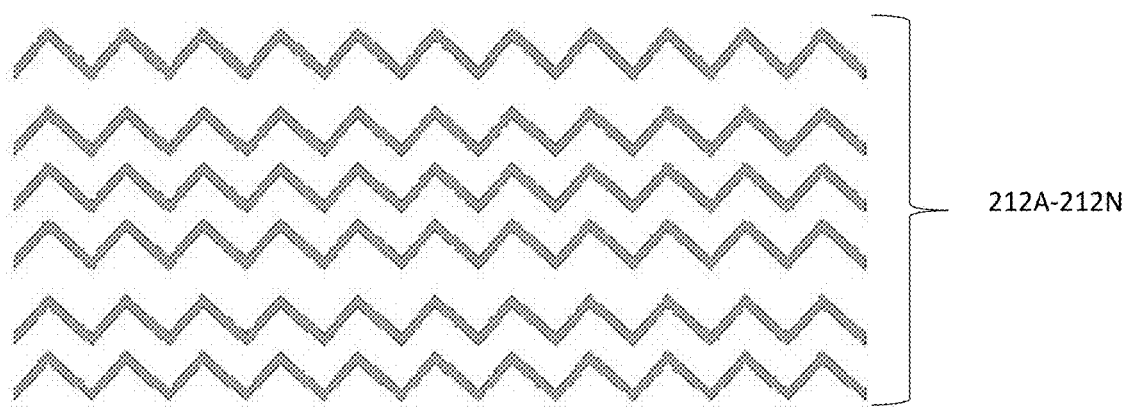
FIG. 4 is a side schematic view of the layers in an air filter in accordance with another embodiment.
Figure 5:
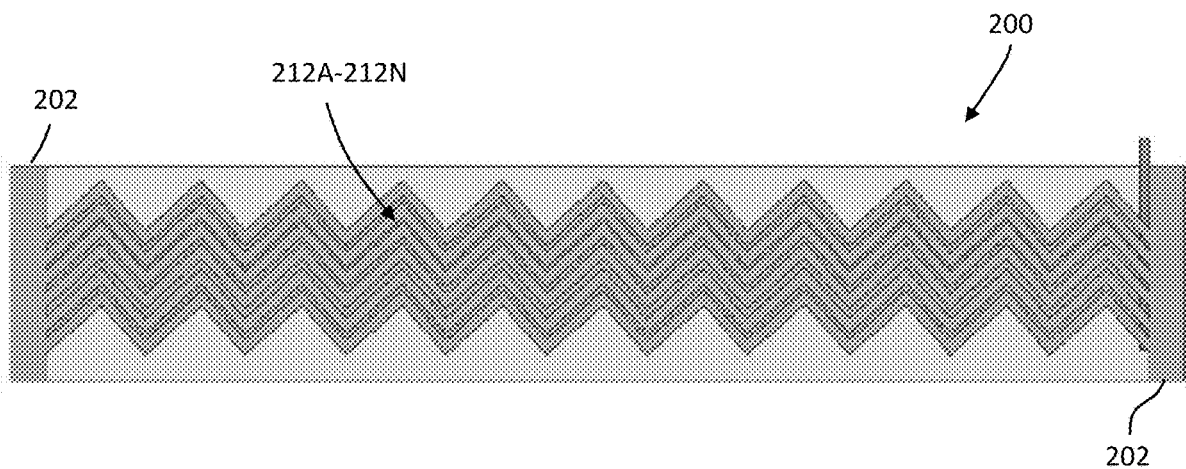
FIG. 5 is a side sectional view of an air filter having the layers of FIG. 4 in accordance with an embodiment.
Figure 6:
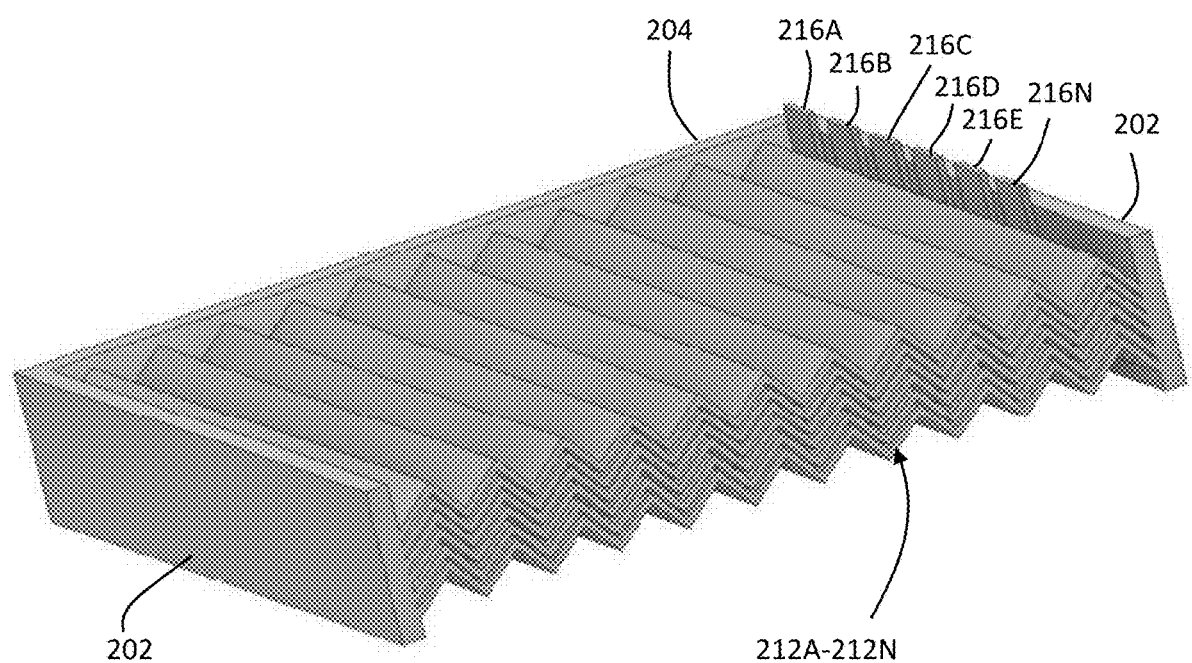
FIG. 6 is a perspective view, partially in section of the air filter of FIG. 5.
Figure 7:
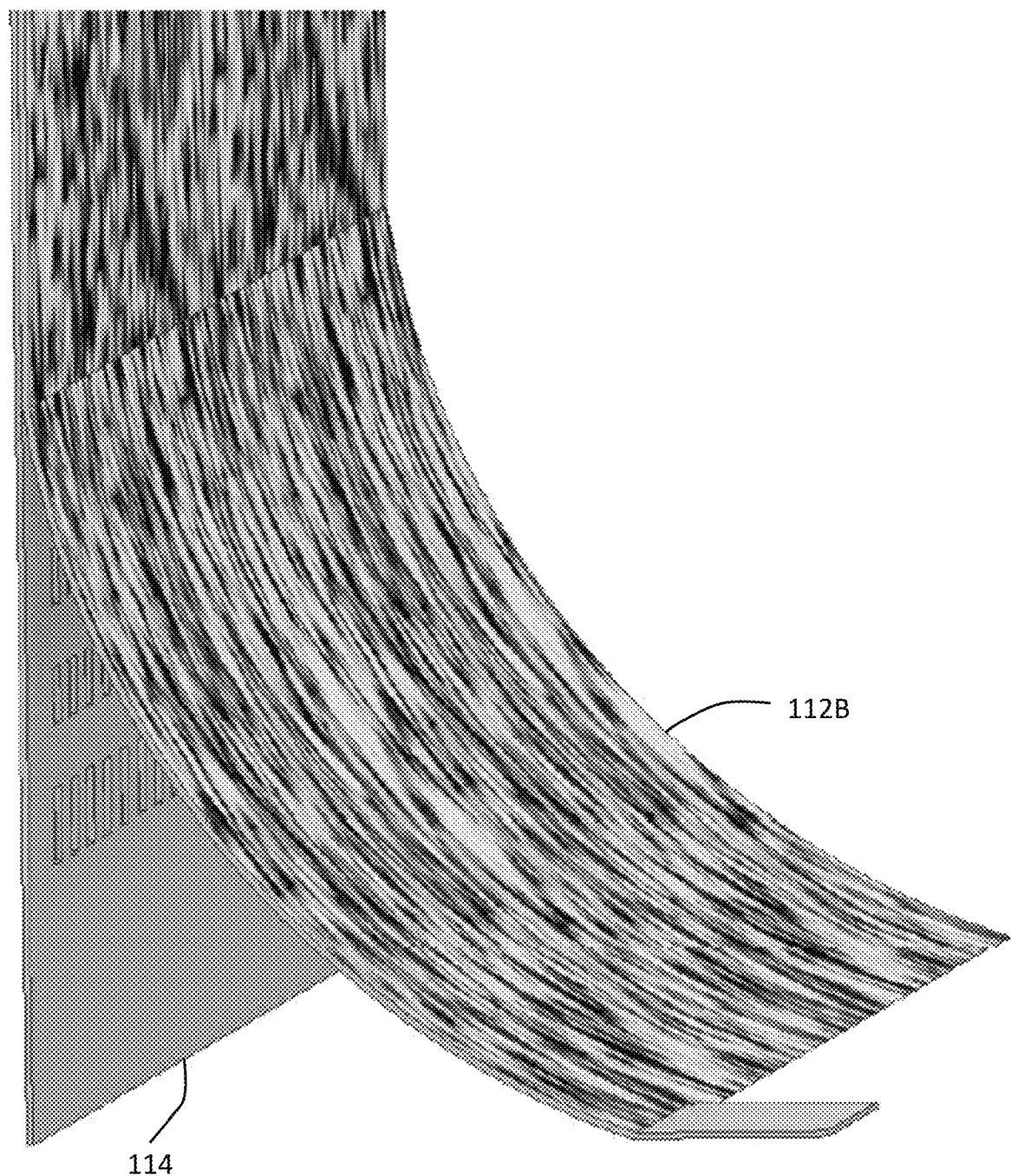
FIG. 7 is a perspective view of an air filter, such as the air filter of FIG. 1, with the final filter layer being removed.
Figure 8:
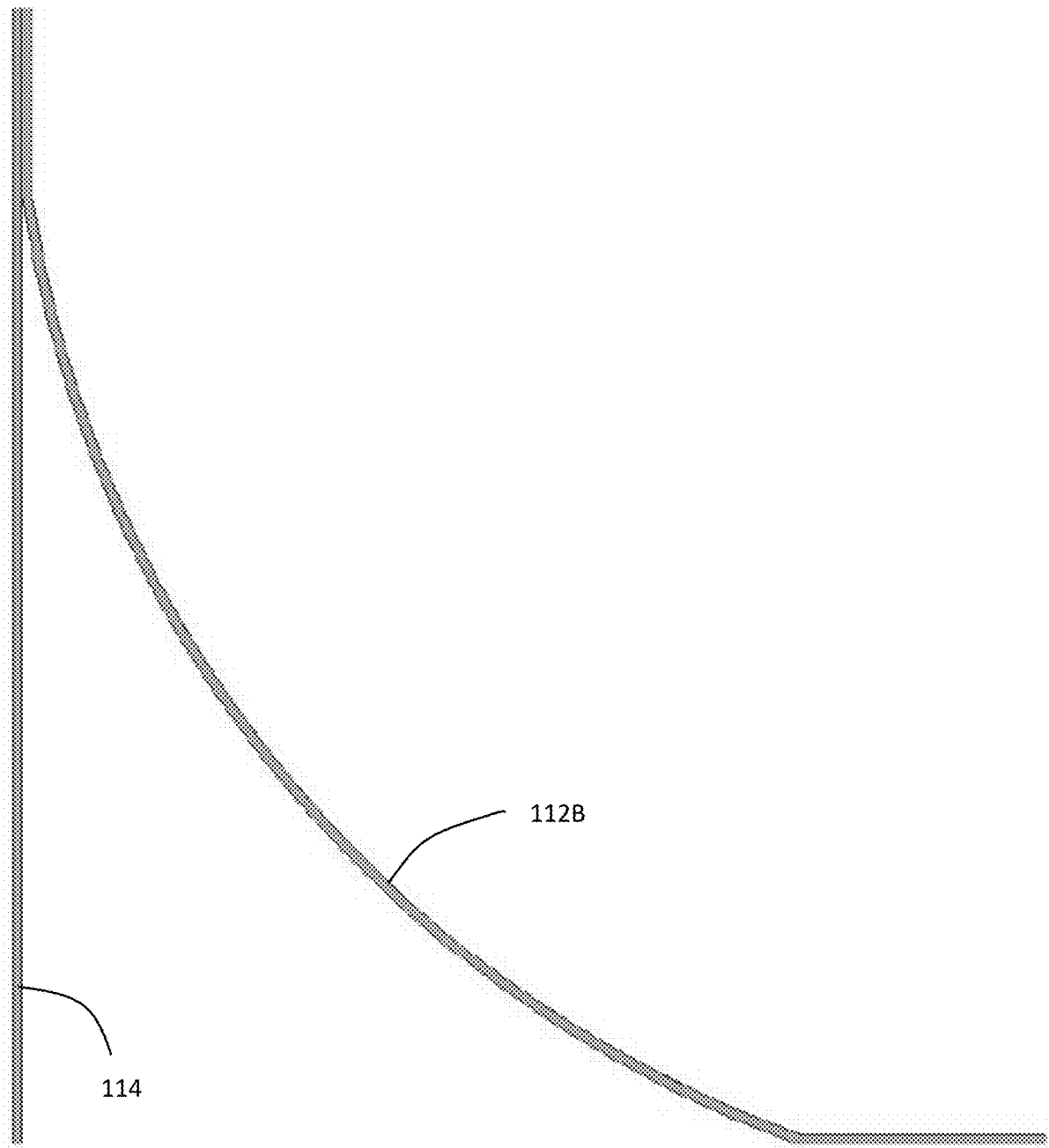
FIG. 8 is a side view of the air filter of FIG. 7.

Further, cotton or cotton like paper material filters that has the same size pores and characteristics that is layered and incorporates the zig-zag pattern that allow for more surface area of filtration, such as is shown for the filter 200 of FIGS. 4-6 for example. This embodiment is generally found in automobiles and higher performance residential filters. In this embodiment, the plurality of layers 212A-212N may have a series of alternating angles that form a series of alternate-angle, "v", or chevron shapes, sometimes referred to as a zig-zag shape. The zig-zag layers 212A-212N are stacked and interlocked (FIG. 5). In an embodiment, the filter 200 includes a pair of support elements 202 disposed on opposite ends of the layers 212A-212N rather than a base layer. In an embodiment, the support elements 202 may be coupled by side walls 204 (FIG. 6). In this embodiment, the tabs 216A-216N may extend perpendicular to the flow of the fluid. In other words, the tabs 216A-216N may extend towards the upstream or inlet side of the filter 200.

It is contemplated that there may be multiple ways to make the layers adhesive to themselves and adhesive to the filter as a hole. The thin paper or plastic pull layers can be adhered in multiple ways. Static adherence. Plastic like materials have a natural static ability to adhere to each other. The method of punching paper or plastic that results in the knife-like action when the layers are being pulled off, leaves an adhesive effect with all the layers. The method of full removal of sections from the plastic or paper layers will also leave a natural tendency of adhesion between the layers if punched when the layers are pre-stacked. All the above methods of adhesion can be combined with an adhesive applied to each layer before the layers are stacked, such as in a roll of tape for household uses. Another way of adhering the layers is to stamp wax on the perimeter edges of the filter layers. This would allow for ease of pulling the layers off 1 by 1. All these above layer adhesion techniques would require the layered section being adhesively joined to the base section of this filter particularly around the perimeter of the base layer so not to interfere with the base mesh layer filtering characteristics.

For layers formed from cotton filters and cotton like filters, in some embodiments more limitations may occur during adhesion of these layers. In some embodiments, adhesion may be formed about the perimeter of the layers to be sure to reduce the risk adhesive on the cotton layers which could reduce filtration ability. In an embodiment, cotton and cotton like filters could have a paper perimeter material and be adhered using an adhesive or a wax stamp. In embodiments where the cotton filter layers have subsequent larger pore sizes as layers are pulled, then the last layer may incorporate the rigid perimeter of the filter that provides the structural integrity of the filter and perform the function of the base layer.

In embodiments, where the layers are formed from plastic or paper mesh, it is contemplated to have multiple layers of plastic mesh material which would have to be adhered utilizing the above technique for cotton filter layers. In some embodiments, Multiple layers of this type of material. (Strewn Plastic Fibers) may be used.

In still another embodiment, the plurality of layers may be fixedly coupled together about their edge or periphery (such as with adhesive or staples). In an embodiment, the plurality of layers are fixedly coupled on three sides, with the fourth side being the side with the tab. In an embodiment, the plurality of filters may be fixedly coupled to the base layer. In this embodiment, a perforation may be formed adjacent the edge, such as from the top to the bottom of the layers for example. When the user pulls on the tab, the perforation for the associated layer would tear or separate, allowing the layer to be removed.

Figure 10:
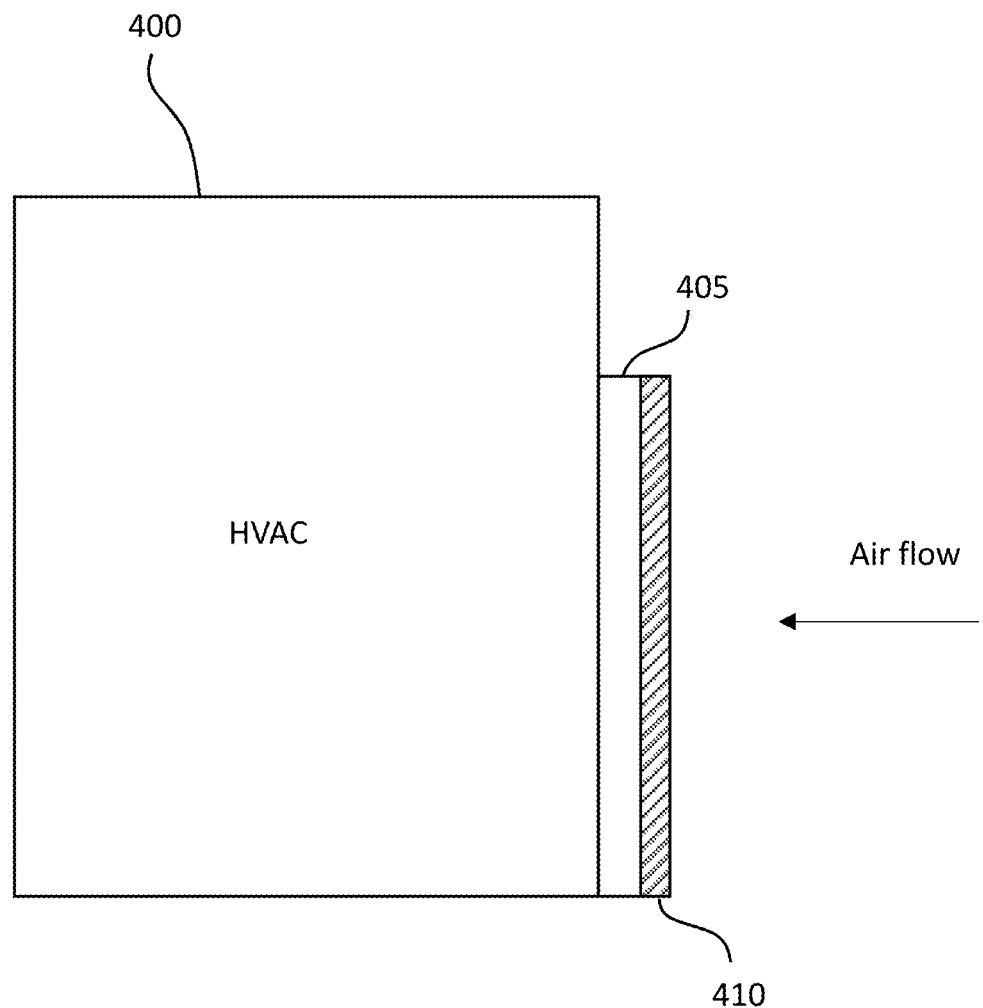
FIG. 10 is a schematic illustration of an HVAC system having an air filter according to one or more embodiments.

Referring now to FIG. 10, an embodiment is shown of a HVAC system 400 such as a residential furnace for example. The HVAC system 400 includes an intake 405 that is sized and shaped to receive a filter 410. It should be appreciated that the filter 410 may be constructed in the same manner as filters 100, 200 described herein. The filter 410 receives air flow from the environment, or optionally from a conduit, and the air passes through the filter 410 before entering the internal assemblies of the HVAC system 400. Generally, the intake 405 is configured to allow the filter 410 to be removed, such as to remove one of the layers of the filter 410 or to replace it when the last layer is removed. In other embodiments, the filter 410 will be disposed within the HVAC system 400 housing and the user accesses the filter 410 via a door or by removing a panel.

It should be appreciated that while embodiments herein may refer to a removal of a layer on a periodic basis (e.g. monthly), this is for example purposes and the claims should not be so limited. In other embodiments the layers may be removed on an aperiodic basis, such as based on other factors such as but not limited to level of debris/particulate, the level of fluid flow through the filter, or another parameter of the system in which the filter is used that is effected by the cleanliness of the filter.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should also be noted that the terms "first", "second", "third", "upper", "lower", and the like may be used herein to modify various elements. These modifiers do not imply a spatial, sequential, or hierarchical order to the modified elements unless specifically stated.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A filter comprising:
   multiple filter layers in plurality with the structural integrity of the filter as a whole, each of the layers having a plurality of pores;
   wherein the layers are perforated to allow any type of filtering as the media being filtered passes through the layers as the outermost layer collects most debris; and
   wherein the layers have an adhesive relationship with each other layer and an optional base layer, so that each layer may be individually removed and the one beneath is exposed as a cleaner filter surface,
   wherein the pores of the layer beneath have a pore size that are larger than the pores of a previously removed layer, and the pore size of the pores of a last layer among the multiple filter layers is largest among all the layers.

2. The filter of claim 1, wherein the filter is sized to fit within a heating ventilation and air conditioning system (HVAC).

3. The filter of claim 1, wherein the filtering includes at least one of osmosis filtering, reverse osmosis filtering, static filtering, and sifting or sieve-like filtering effect.

4. A filter comprising:
   a base layer; and
   a plurality of layers including a top layer and an opposing bottom layer, each of the plurality of layers removably coupled to each other, one of the plurality of layers being coupled to the base layer, each of the plurality of layers having filter media that allows a fluid to flow therethrough, and wherein each of the plurality of layers includes a tab extending therefrom,
   wherein each of the plurality of layers has a plurality of pores, and
   wherein a pore size of the pores in a given layer increases as the layers extend from the top layer to the bottom layer.

5. The filter of claim 4, wherein the plurality of layers have a parallelepiped shape.

6. The filter of claim 4, wherein the plurality of layers have a cylindrical shape.

7. The filter of claim 4, wherein the plurality of layers are removably coupled to each other on four or fewer sides.

8. The filter of claim 7, wherein the plurality of layers are removably coupled to each other on three or fewer sides.

9. The filter of claim 4, wherein each of the plurality of layers includes at least one perforation.

10. The filter of claim 4, wherein the plurality of layers are removably coupled to each other by an adhesive.

11. The filter of claim 4, wherein the plurality of layers are removably coupled to each other by a mechanical fastener.

12. The filter of claim 11, wherein the mechanical fastener is a staple.

13. The filter of claim 4, wherein the plurality of layers are removably coupled to each other via static adhesion.

14. The filter of claim 4, wherein the plurality of layers are removably coupled to each other via an adhesive tape.

15. The filter of claim 4, wherein each of the tabs includes an indicia thereon, the indicia indicating when a maintenance action is to occur.

16. A method for operating a filter comprising:
   placing a filter within a device, the filter having a plurality of layers that include a top layer and an opposing bottom layer, and that are removably coupled to each other, each of the layers having a tab thereon wherein each of the plurality of layers has a plurality of pores, and wherein a pore size of the pores in a given layer increases as the layers extend from the top layer to the bottom layer;

operating the filter in the device; and on a periodic or aperiodic basis, removing a layer from an inlet side of the filter.

17. The method of claim 16, wherein the device is a heating, ventilation, and air conditioning unit.

18. The method of claim 16, wherein the device is a furnace.

\* \* \* \* \*